US010610817B2

(12) United States Patent
Swan et al.

(10) Patent No.: US 10,610,817 B2
(45) Date of Patent: Apr. 7, 2020

(54) CLEANROOM WORKSTATION PARTICLE CAPTURE SYSTEM

(71) Applicants: Jawn P. Swan, Los Angeles, CA (US); Stephen Carfaro, Camarillo, CA (US); Keith Swan, Sylmar, CA (US)

(72) Inventors: Jawn P. Swan, Los Angeles, CA (US); Stephen Carfaro, Camarillo, CA (US); Keith Swan, Sylmar, CA (US)

( * ) Notice: Subject to any disclaimer, the term of this patent is extended or adjusted under 35 U.S.C. 154(b) by 52 days.

(21) Appl. No.: 15/801,040

(22) Filed: Nov. 1, 2017

(65) Prior Publication Data

US 2018/0154296 A1    Jun. 7, 2018

Related U.S. Application Data

(60) Provisional application No. 62/496,942, filed on Nov. 2, 2016.

(51) Int. Cl.
| | |
|---|---|
| *B01D 46/10* | (2006.01) |
| *B01D 46/12* | (2006.01) |
| *A61L 9/20* | (2006.01) |
| *B01D 46/00* | (2006.01) |

(52) U.S. Cl.
CPC ......... *B01D 46/0043* (2013.01); *B01D 46/10* (2013.01); *B01D 2279/35* (2013.01); *B01D 2279/51* (2013.01)

(58) Field of Classification Search
CPC ............... B01D 46/12; B01D 46/0006; B01D 46/0005; B01D 46/0023; B01D 49/00; B01D 46/0043; B01D 46/10; B01D 2279/35; B01D 2279/51; A61M 1/008; A61L 9/20

USPC ... 55/385.1, 385.2, 473, 485, 417, 356, 418, 55/471, DIG. 18, DIG. 46; 454/63, 66, 454/56, 49, 67, 187

See application file for complete search history.

(56) References Cited

U.S. PATENT DOCUMENTS

| | | | | |
|---|---|---|---|---|
| 4,237,780 | A | * | 12/1980 | Truhan .................. B01D 46/12 454/52 |
| 4,333,745 | A | | 6/1982 | Zeanwick |
| 4,560,395 | A | | 12/1985 | Davis |
| 4,624,690 | A | | 11/1986 | Byrnes |
| 4,747,857 | A | * | 5/1988 | Andrews ................. F24F 13/24 55/315 |

(Continued)

OTHER PUBLICATIONS

"Contamination Control Particle Trap Capture Particles/Fumes Right At the Source!!", from Static Clean International Aug. 2014.

*Primary Examiner* — Minh Chau T Pham
(74) *Attorney, Agent, or Firm* — Ferguson Case Orr Paterson LLP

(57) ABSTRACT

Cleanroom particle capture systems and cleanroom workstations include a duct carrying a particle capture air stream. A fan and a particle filter are arranged at the first end of the duct with at least some of the particle capture air stream passing through the filter, wherein the particle capture airstream has a first air velocity at the filter. A blow off device provides a blow off airstream into the duct at a second end of the duct, with the blow off airstream having a second air velocity at the second end that is higher than the first air velocity. The duct has one or more intervening features to reduce the second air velocity such that it substantially matches the first air velocity when the blow off airstream reaches the filter.

21 Claims, 9 Drawing Sheets

(56) References Cited

U.S. PATENT DOCUMENTS

| | | | |
|---|---|---|---|
| 5,053,065 A | 10/1991 | Garay et al. | |
| 5,199,846 A | 4/1993 | Fukasaku et al. | |
| 5,399,319 A * | 3/1995 | Schoenberger | A61L 9/20 422/121 |
| 5,702,493 A * | 12/1997 | Everetts | B01D 46/0006 454/63 |
| 5,849,053 A * | 12/1998 | Napadow | B05B 14/43 55/385.2 |
| 6,116,249 A * | 9/2000 | Tuffery | A45D 29/05 132/200 |
| 6,174,342 B1 | 1/2001 | Jeanseau | |
| 6,217,281 B1 | 4/2001 | Jeng et al. | |
| 6,428,611 B1 * | 8/2002 | Andolino | B03C 3/66 55/DIG. 18 |
| 6,444,002 B1 * | 9/2002 | Mai | A45D 29/00 454/56 |
| 6,670,290 B2 * | 12/2003 | Kisakibaru | H01L 21/67017 438/800 |
| 6,716,265 B2 * | 4/2004 | Hung | B01D 46/0002 454/139 |
| 6,758,875 B2 * | 7/2004 | Reid | B01D 46/0005 266/48 |
| 7,094,266 B2 * | 8/2006 | Montgomery | A61M 1/008 128/207.14 |
| 7,338,358 B2 * | 3/2008 | Kim | F24F 3/1603 454/252 |
| 7,753,977 B2 * | 7/2010 | Lyons | B01D 46/0023 55/385.1 |
| 8,349,045 B2 * | 1/2013 | Jarrier | F02C 7/055 454/275 |
| 8,430,940 B2 * | 4/2013 | Nguyen | A45D 29/00 132/73 |
| 8,523,970 B2 * | 9/2013 | Lakdawala | F24F 3/1603 55/356 |
| 8,603,217 B2 * | 12/2013 | Sukhman | B01D 53/04 55/338 |
| 8,834,591 B2 * | 9/2014 | Rafi | B01D 46/0005 55/482 |
| 8,979,959 B2 * | 3/2015 | Roughton | B01D 46/0023 55/323 |
| 9,234,484 B2 * | 1/2016 | Lewington | F02M 35/10013 |
| 9,835,338 B2 * | 12/2017 | Schrock | F24C 15/2028 |
| 2005/0048898 A1 | 3/2005 | Ta-Kuang et al. | |
| 2008/0076343 A1 * | 3/2008 | Pyers | F24F 3/1607 454/141 |
| 2011/0179756 A1 * | 7/2011 | Chen | B01D 46/0012 55/484 |
| 2015/0000232 A1 * | 1/2015 | Hammers | B01D 49/00 55/385.1 |

* cited by examiner

Lower Velocity | High Velocity

FIG. 3
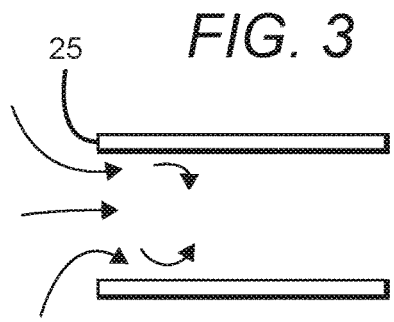
Prior Art
FIG. 4
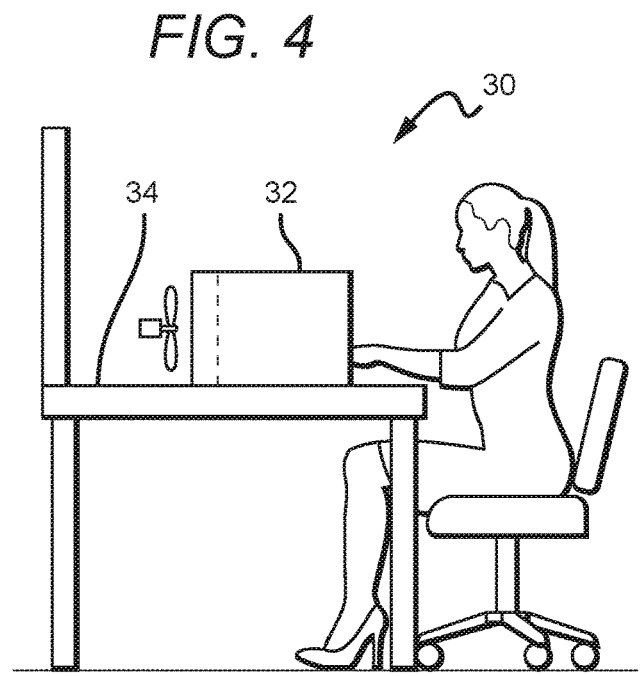
Prior Art
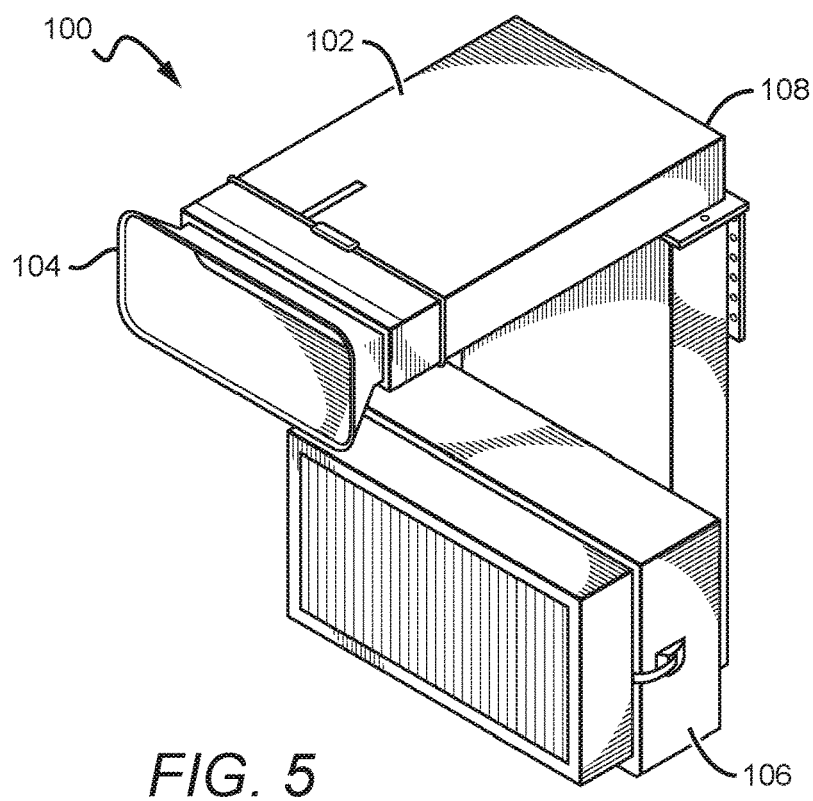
FIG. 5

FIG. 15
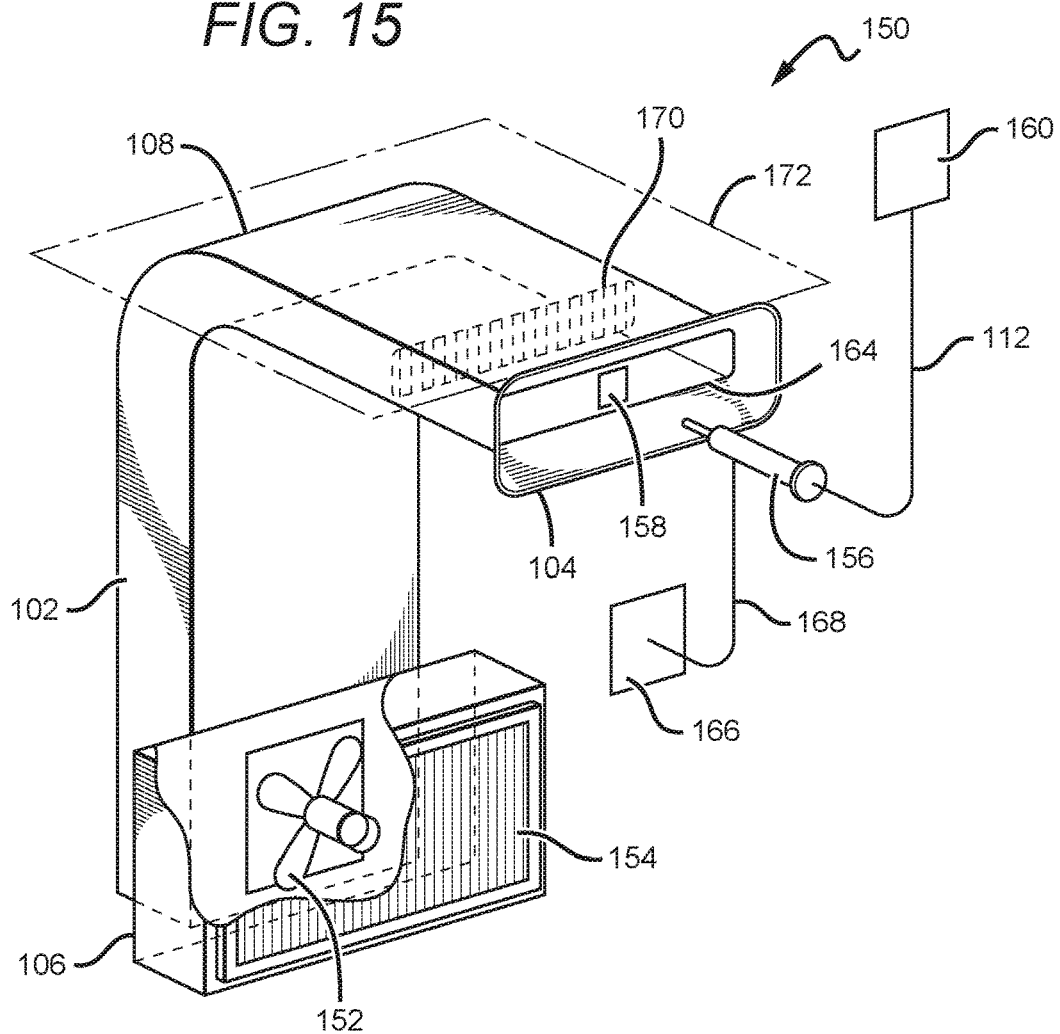
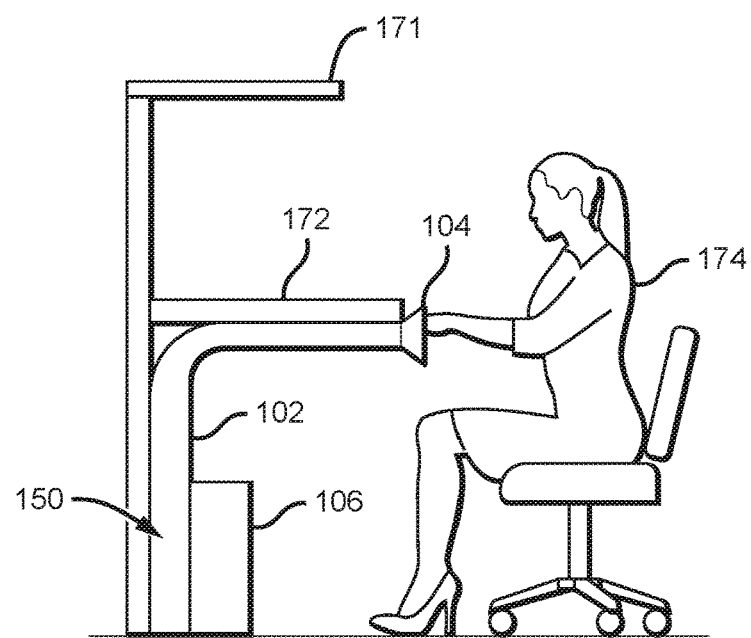
FIG. 17

CLEANROOM WORKSTATION PARTICLE CAPTURE SYSTEM

This application claims the filing date and benefit of U.S. Provisional Patent Appl. Ser. No. 62/496,942, filed on Nov. 2, 2016.

BACKGROUND OF THE INVENTION

Field of the Invention

This invention relates to systems for the capture of particles, and in particular to systems for the removal of particulate contaminants from parts or devices such as at a cleanroom workstation.

Description of the Related Art

When cleaning various substrates, parts or devices in a cleanroom, compressed air ionizing blow-off guns and nozzles can be used to neutralize surface static charges and blow off contaminants. In conventional cleanrooms, the particles can remain airborne in the workstation environment, presenting a danger that the particles can find their way back onto the products. This presents a dangerous cycle of contaminants being blown off, sent airborne, and then returning.

A conventional system has been developed that is intended to capture a compressed air stream of blow off particulate contaminants into a negative pressure open face work chamber where the system is to collect the particles at a replaceable high efficiency particulate air (HEPA) filter. This capture system is designed to be a bench top device that uses an exhaust fan downstream of the filter to provide negative pressure.

FIG. 1 shows is a schematic of an existing particle capture system 1 that comprises a work chamber 6, filter element 8 and an exhaust fan 12. A work piece 10 can be held in the work chamber 6, and a pressurized air source 14 and air line 18 can provide a blow off air stream 16 that blows particles 24 off the work piece 10 in the direction of the exhaust fan 12. The negative pressure from the fan 12 is designed to draw the particles into the filter element 8 where they can be captured. The system 10 can also comprise and ionizing means 20 and ionizing power supply 22 to counter static charge that might hold the particulates to the work piece 10.

This existing system may be adequate for some applications, but for critical components, such as implantable medical devices, these systems are inadequate and present certain disadvantages. One primary disadvantage is that this system suffers from a phenomenon known as "blow back." Referring now to FIG. 2, this blow back can occur when a particle 24 that has been blown off the work piece by the airstream 16 and is carried downstream toward the filter 8 by the negative pressure of the fan 12, is not captured by the filter 8. Instead, the particle can flow around inside the work chamber 6 and be directed back toward the user and work piece. This blow-back is partially caused by the relatively short distance from the point of cleaning to the point of capture at the filter 8. The velocity of the blow-off air may be greater than the velocity of the exhaust air, which can result in a maelstrom of air currents and particulates inside the chamber 6 as best shown in FIG. 2. These currents can prevent the particulates from reaching the filter element 8 and can result in the particulates moving away from the filter element 8.

Another contributing factor to blow back can be the design of the inlet to the work chamber 6 shown in FIGS. 1 and 2. Referring now to FIG. 3, the inlet can comprise a hard edge 25 that is a straight surface that can produce indraft turbulence. This can cause significant losses in the indraft velocity pressure, which greatly reduces the ability of the indraft airstream to efficiently carry particulates to the filter 8 shown in FIGS. 1 and 2. The uncaptured particulates caused by the blow back can head back upstream where they can not only contaminate the part or the user, they can also contaminate the ambient air in the clean room environment.

Another disadvantage of these conventional systems is that they are designed to reside on the bench top of a work station. FIG. 4 shows a cleanroom work station 30 with a conventional particle capture system 32 on the bench top 34. The capture system 32 has a relatively large footprint and consumes space on the bench that could be used for other purposes, such as for placing work pieces, packaging, test equipment, etc., all of which can be important to an efficient work environment.

SUMMARY OF THE INVENTION

The present invention is improved particle capture systems and cleanroom workstations utilizing the particle capture systems. Different embodiments can comprise different components and features arranged in different ways, with some embodiments comprising a blow off air gun (may be ionized), an inlet cone or bell mouth, a direction changing plenum, a fan and a filter. In operation, the air gun dislodges particulate debris from a part or target substrate using high velocity, low volume ionized air. The fan generates a high volume, low velocity air inrush or vacuum in the direction changing plenum, and the air from the air gun and dislodged debris are then entrained in the air inrush or vacuum at the inlet cone or bell mouth. The vacuum conveys the particles through the direction changing plenum. The particles are then sucked through the fan and pushed/captured against the high efficiency filter. The direction changing plenum (or duct) is arranged to compensate for the high velocity, low volume air from the air gun such that the particle capture systems according to the present invention experience substantially no blow back.

Some embodiments of the particle capture systems according to the present invention are arranged primarily below the bench top of a workstation to free up the surface area of the bench top. The components of the particle capture system are arranged for convenient use, while not substantially interfering with the space under the bench top. It is understood that other embodiments can be arranged on or above the bench top.

These and other aspects and advantages of the invention will become apparent from the following detailed description and the accompanying drawings, which illustrate by way of example the features of the invention.

BRIEF DESCRIPTION OF THE DRAWINGS

FIG. 3 is a schematic view of a hard edge inlet for conventional particle capture systems and related air turbulence;

FIG. 4 is a side view of a cleanroom workstation with a conventional table top particle capture system;

FIG. 5 is a top perspective view of one embodiment of a particle capture system according to the present invention;

FIG. 15 is a perspective schematic view of one embodiment of a particle capture system according to the present invention;

FIG. 17 is a side view of one embodiment of a cleanroom workstation utilizing a particle capture system according to the present invention;

DETAILED DESCRIPTION OF THE INVENTION

Figure 1:
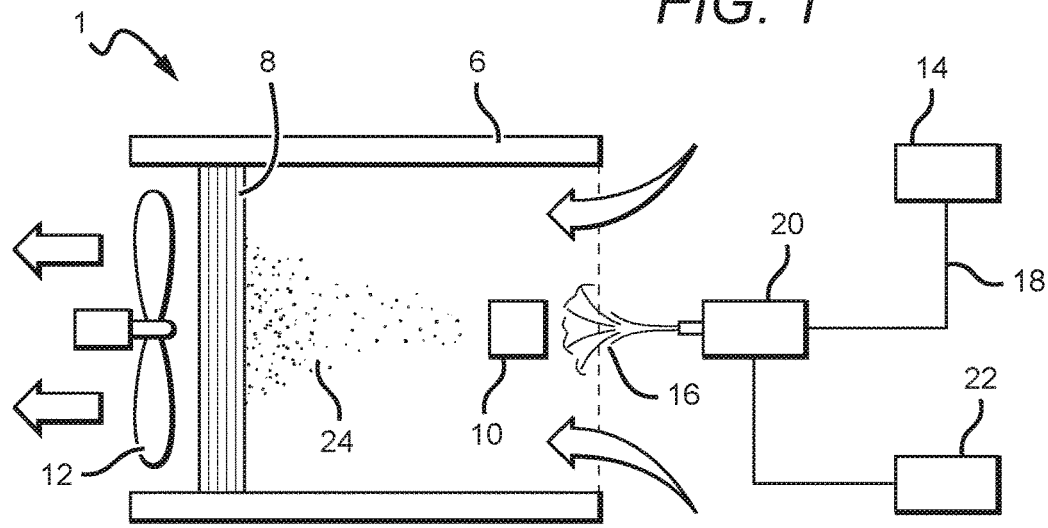
FIG. 1 is a schematic view of a conventional table top particle capture system.
Figure 2:
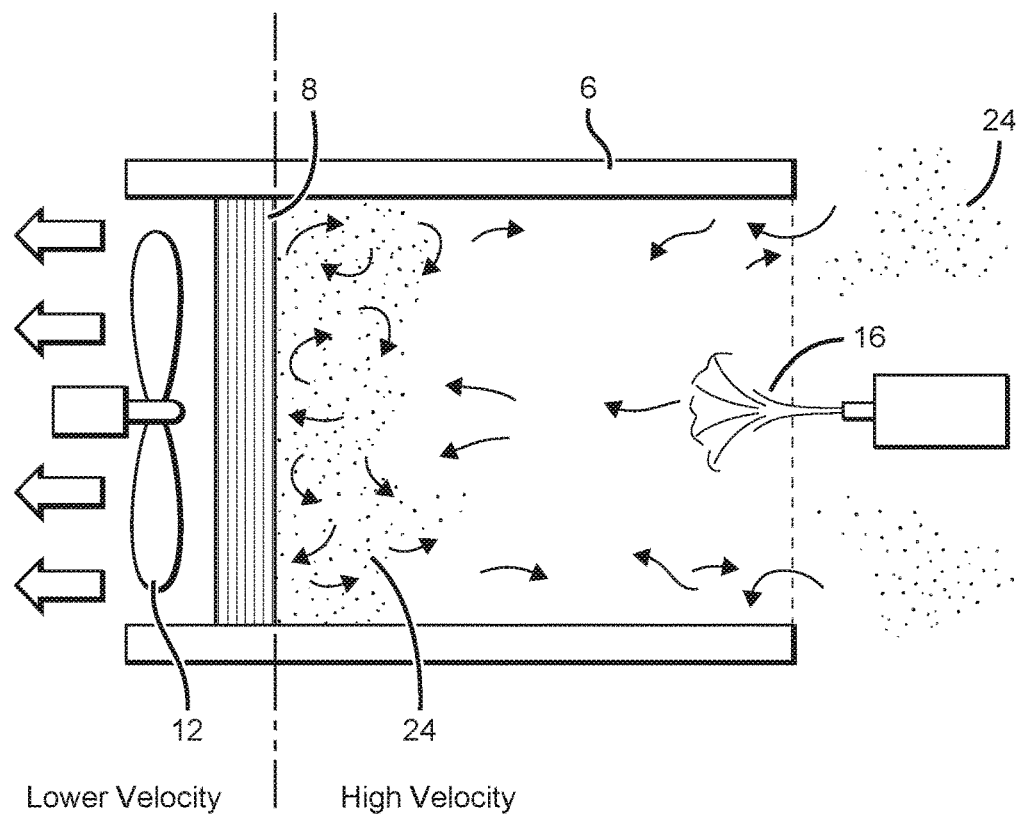
FIG. 2 is another schematic view of a conventional table top particle capture system showing its internal air currents.
Figure 6:
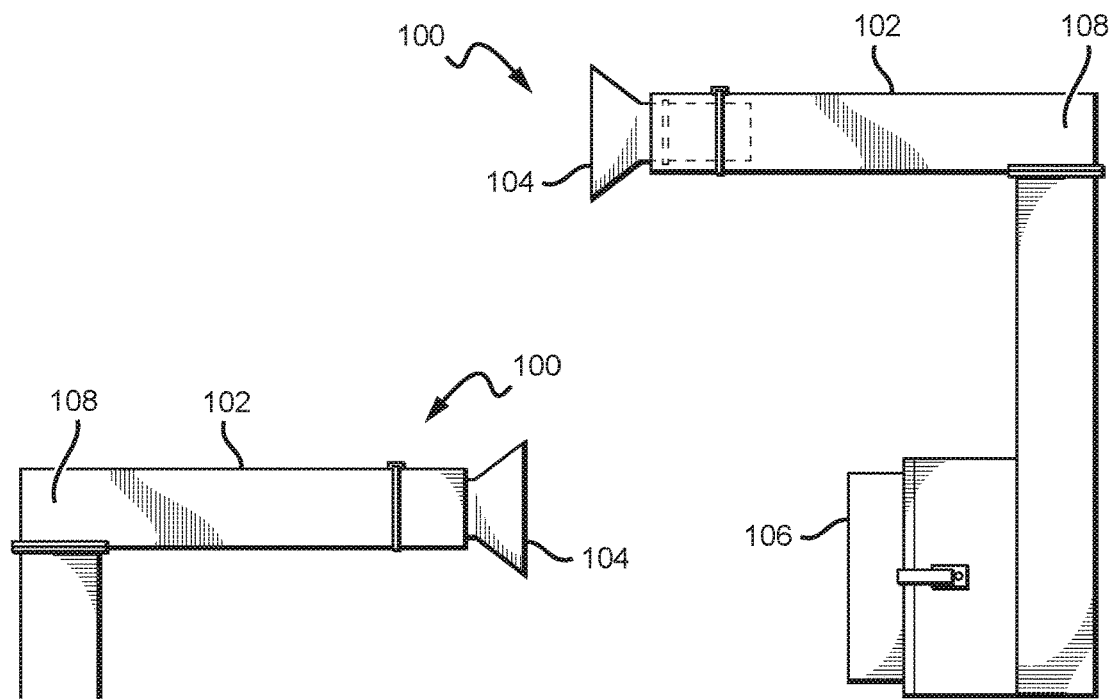
FIG. 6 is a side elevation view of the particle capture system shown in FIG. 5.
Figure 7:
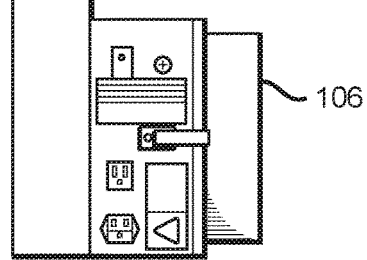
FIG. 7 is an opposing side elevation view of the particle capture system shown in FIG. 5.
Figure 8:
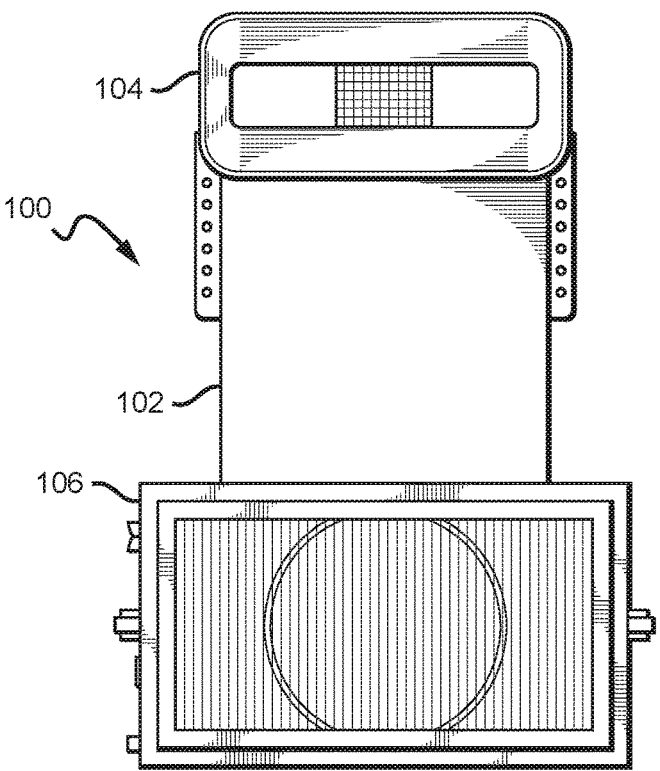
FIG. 8 is a front elevation view of the particle capture system shown in FIG. 5.
Figure 9:
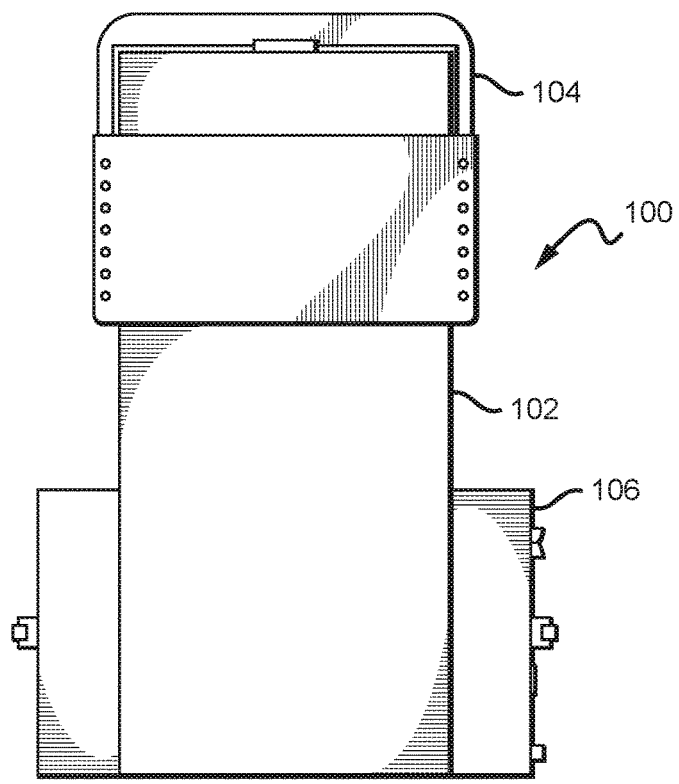
FIG. 9 is a back elevation view of the particle capture system shown in FIG. 5.
Figure 10:
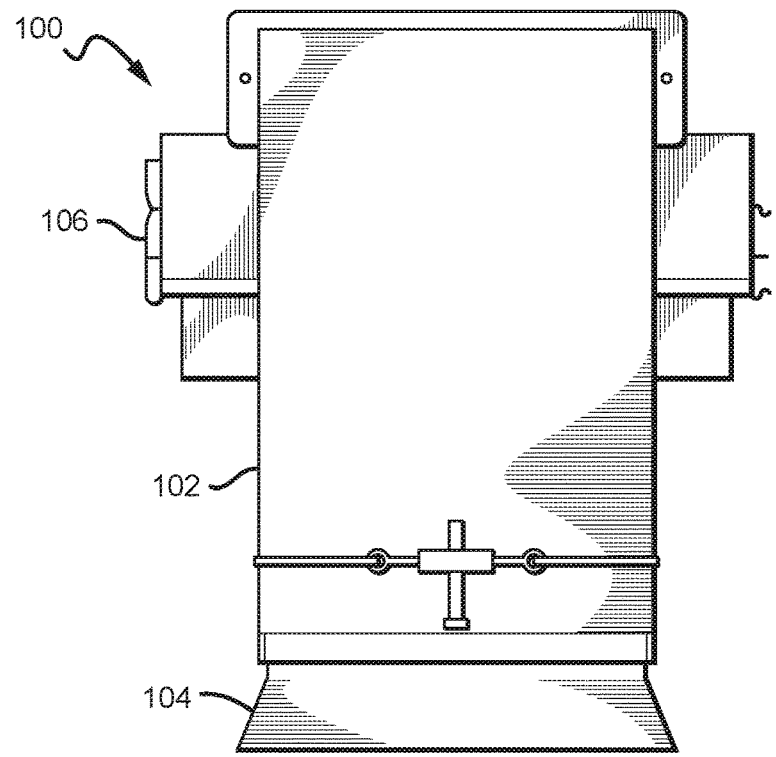
FIG. 10 is a top view of the particle capture system shown in FIG. 5.
Figure 11:
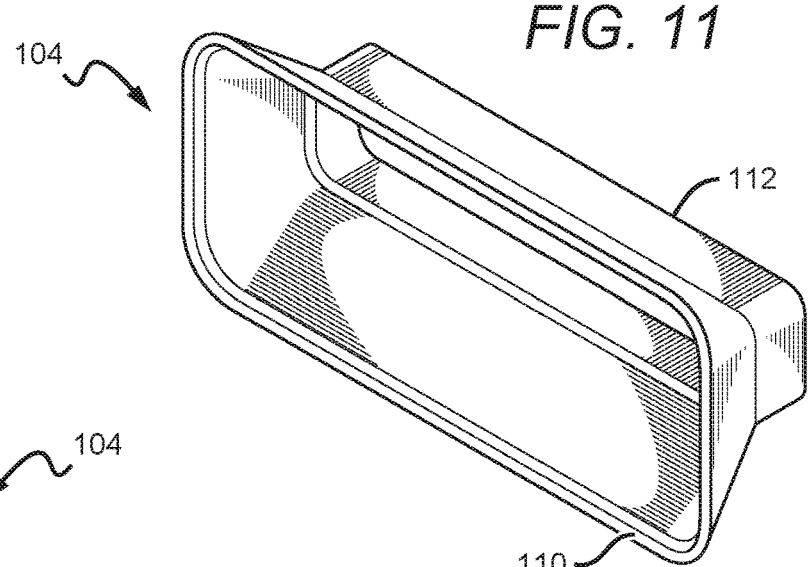
FIG. 11 is a top perspective view of one embodiment of a particle capture system inlet according to the present invention.
Figure 12:
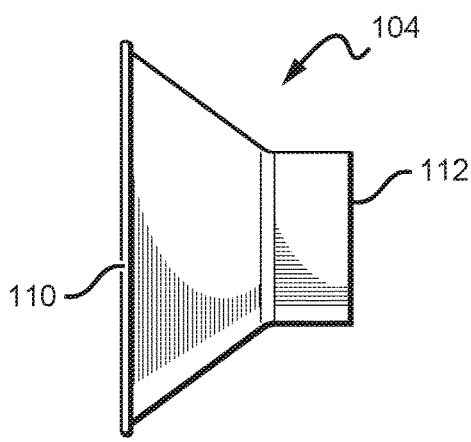
FIG. 12 is a side elevation view of the inlet shown in FIG. 11.
Figure 13:
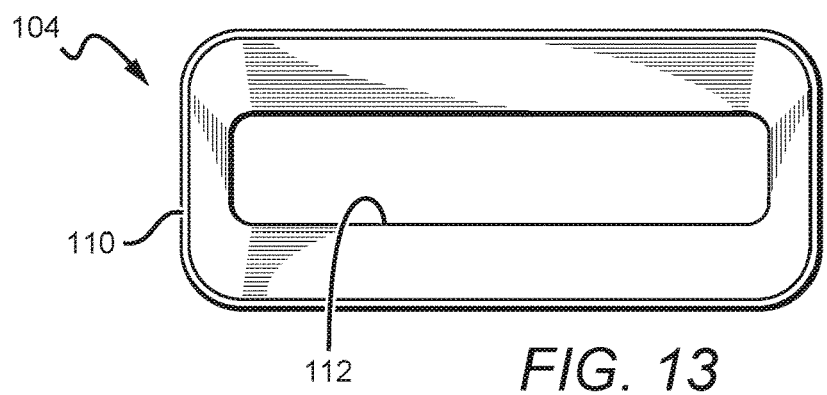
FIG. 13 is a front elevation view of the particle capture system shown in FIG. 11.
Figure 14:
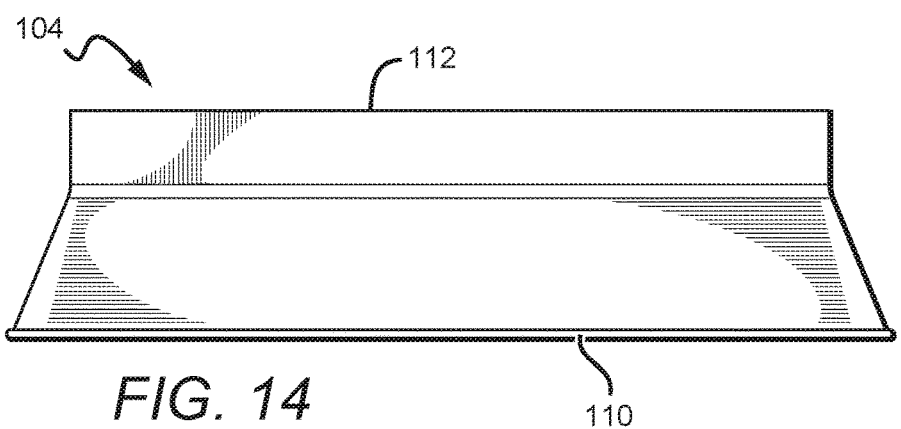
FIG. 14 is a top view of the particle capture system shown in FIG. 11.

The present invention is directed to various embodiments of particle capture systems and also to workstations that utilize the particle capture systems. The systems can be used for many different applications, but are particularly applicable to cleanrooms and workstations for critical components or work pieces, such as implantable medical devices. For these critical components it is necessary to have an effective and reliable particle capture system for the removal of particles. The particles are typically blown off of the components and the particle capture systems according to the present invention efficiently capture the particles so that they are removed from the surrounding cleanroom environment and do not return to the component.

Particle capture systems according to the present invention can be arranged to convey and capture particulate debris at a filter. As described above, some embodiments comprise five major components including an ionized air gun, an inlet cone or bell mouth, a direction changing plenum a fan and a filter. In operation, the ionized air gun dislodges particulate debris from a part or target substrate using high velocity, low volume ionized air. The air from the air gun and dislodged debris are then entrained by the high volume low velocity air inrush generated by vacuum at the inlet cone or bell mouth. The vacuum generated high volume low velocity air conveys the particles through the direction changing plenum. The particles are then sucked through the fan and pushed/captured against the high efficiency filter.

In some embodiments, all or substantially all of the air moving through the plenum passes through the fan and then the filter. The high volume, low velocity air from the fan is such that it can overcome the low volume, high velocity air generated by the ionized air gun, which results in little or no blow back in the direction changing plenum and essentially no blow back of the particles. In some embodiments, the particulate debris experience three phases of motion. First the particles are dislodged by forced air or pushed off the work piece or substrate. Next the particles are entrained or captured in a vacuum conveyance or airstream in the direction changing plenum. After passing through the plenum, the particles pass through the fan and are pushed or forced against and captured by a filter.

As more fully described below, the direction changing plenum can comprise duct features that help the high volume, low velocity air overcome and compensate for the low volume, high velocity air from the air gun. These features can include, but are not limited to, an increased distance between the inlet and fan, or different types and numbers of bends in the duct. The inlet can also have a shape that reduces air turbulence at the inlet, with some embodiments having a bell mouth shaped opening. The air flow efficiency from a bell mouth type inlet compared to a "hard edge" inlet can be a significant improvement.

Some embodiments of a particle capture system according to the present invention can be arranged below a table top or bench top ("bench top") of a cleanroom workstation, while other embodiments can be on the bench top. For those below the bench top, the particle capture system provides the advantage of not interfering with bench top work space of user. The duct and plenum can be shaped to underside of work bench to minimize the use of space below the bench top and to leave room for the user's legs. The system also conveniently locates the system inlet at the front edge of the bench top. All these allow for ease of convenient and comfortable use of the system.

The systems according to the present invention provide the further advantage of generating moderate noise and moderate negative air stream at the inlet. Both of these result in providing a more comfortable work environment for the user. Specifically, it may not be practical to provide bigger or higher-powered fan to compensate for the higher velocity, low volume air from the air gun. Bigger fans result in greater system noise and power consumption. Also, a higher velocity air stream from a bigger or higher-powered fan can result in an air stream at the inlet that is difficult for an operator to work in. Delicate parts must be held tighter in order not to drop them in the air stream. Also, inrush drafts around the work area can be and uncomfortable for an operator, and can draw in the user's clothing or other surrounding objects. The present invention allows for the use of lower velocity high volume airstream fans, while still providing for efficient particle capture.

The present invention is described herein with reference to certain embodiments, but it is understood that the invention can be embodied in many different forms and should not be construed as limited to the embodiments set forth herein. In particular, the particle capture systems according to the present invention can have many different features beyond those described below and in different embodiment the features can be arranged in different ways. Although the different embodiments of particle capture systems discussed below are directed to use in cleanroom workstations, they can be used in many other applications.

It is also understood that when an element is referred to with terms such as being "on" or "connected to" another element, it can be directly on the other element or intervening elements may also be present. Furthermore, relative terms such as "upper", "above", "lower", "beneath", and "below", and similar terms, may be used herein to describe a relationship of one feature or another in a particle capture system or workstation. It is understood that these terms are intended to encompass different orientations of the device in addition to the orientation depicted in the figures and to encompass intervening features.

Embodiments of the invention are described herein with reference to certain view illustrations that can be schematic illustrations of embodiments of the invention. As such, the actual features can be different, and variations from the shapes of the illustrations as a result, for example, of manufacturing techniques and/or tolerances are expected. Embodiments of the invention should not be construed as limited to the particular shapes of the features illustrated herein but are to include deviations in shapes. For example, a feature illustrated or described as square or rectangular will typically have rounded or curved features due to normal manufacturing tolerances. Thus, the features illustrated in the figures are schematic in nature and their shapes are not intended to illustrate the precise shape and are not intended to limit the scope of the invention.

FIGS. 5-10 show one embodiment of a particle capture system 100 according to the present invention that generally comprises a direction changing plenum 102 having a shaped inlet 104 at one end and fan plenum 106 at the other end. In some embodiments, the direction changing plenum 102 can comprise a duct, and the duct 102 and plenum 106 can be made of many conventional materials such as rigid materials such as metals or plastics. In some embodiments the duct and plenums can comprise a polyvinyl chloride (PVC) type material, while in other embodiments the duct can comprise a sheet metal. In still other embodiments the duct can comprise a flexible material.

The fan plenum 106 comprises a housing that can have many different shapes and sizes and is arranged to hold an exhaust fan and a particle capture filter. Many different commercially available fans can be used, such as the R2E220 Series fan from EMB Pabst, Inc. The fan should be relatively low noise, with some embodiments emitting less than 100 dBA or less, while others can emit 70 dBA or less. In some embodiments, the fan can emit approximately 66 dBA. As further described below, in some embodiments the filter can be before the fan such that particles are pulled through the filter, while in other embodiment the filter can be after or downstream from the fan so that the particles are pushed against the filter.

Many different types of particle capture filters can also be used, with some embodiments using one or more commercially available HEPA filters. These filters can provide different levels of filtering performance, with some embodiments having filters greater that 90% efficiency with particles with a diameter smaller than 100 microns. In some embodiments, the filter can have a 99.97 percent efficiency with particles having a diameter as small as 0.3 microns. Different embodiments of the present invention can have fans that draw different volumes of air, with this volume typically varying depending on whether the filter is clean. In some embodiments, the fan can draw more than 200 cubic feet per minute (CFM) when the filter is clean. In some embodiments, the fan can draw approximately 260 CFM when the filter is clean. This fan capacity can result in a velocity of air of the inlet of approximately 400 FPM.

The duct 102 provides a separation between the inlet 104 and fan plenum 106 and also a change in direction for the airflow between the inlet 104 and the fan plenum 106. The change in direction is provided by a bend 108 that not only provides a duct shape that conforms to the space under a work bench, it also combines with the effects of the separation to allow for high volume/low velocity air from the plenum fan to compensate for the low volume/high velocity air from the air gun at the workpiece near the inlet 104 to drop significantly before reaching the plenum 106. The change in direction (i.e. right angle) caused by the bend can reduce the velocity of air from the air gun and the airflow speed can be further reduced by travelling along the separation provided by the duct.

The duct 102 in the embodiment shown has a generally rectangular cross-section, but ducts with different shaped cross-sections can also be used including but not limited to square, polygon, circular, oval, etc. In the embodiment shown the bend 108 is approximately 90 degrees, but it is understood that other embodiments can have more than one bend, or can have a bend at a different angle. Some embodiments can have a bend that is greater than 90 degrees, while others can have a bend that is less than 90 degrees. In still other embodiments the duct can comprise one or more curves or waves, while in still other embodiments the duct can have no bends or curves.

The duct 102 according to the present invention can have many different lengths, with the preferred embodiment having a length greater than 25 inches. In other embodiments the duct should be short enough to fit under the bench top while still leaving space for the user's legs. In some embodiments, the duct has a length of 100 or less, with some of these embodiments having a duct that is approximately 45 inches long. This allows for the duct to have a vertical and horizonal portion that allows for the inlet 104 to be at the front edge of the bench top, allows for the duct to bend near the back of the bench top, and allows for the plenum to be under the bench and near the floor.

The length of duct 102 and the bend 108 results in air reaching the fan not being impacted by the high velocity air of the air gun. Accordingly, the air speed both before and after the fan is substantially the same. This, along with the shape of the inlet, reduces or eliminates blow back and results in particles reaching the filter for efficient and reliable particle capture. In some embodiments, the air velocity reaching the fan is approximately the same as the air velocity produced by the fan, while in other embodiments the air velocity reaching the fan is less than the air velocity of the fan. In some embodiments, the air reaching the fan is less 20% different from the air velocity produced by the fan, while in other embodiments it is less than 10% different. In still other embodiments it is less than 5% different.

In the embodiment shown, the fan plenum 106 is mounted to the front of and at one end of the duct 102. In this arrangement, the plenum can be below the bench top as discussed herein, and by being arranged at the front the duct 102, the air drawn into the duct also experiences a second change in direction, which can also reduce blow-back as discussed above. This arrangement also allows for convenient access to the fan plenum 106 for replacement of the filter or other servicing, such as repair of the fan. It is understood that in other embodiments the plenum can be in other locations, such as at the backside of the duct 102 or at the very end of the duct 102.

The entrance or inlet 104 can have many different shapes and sizes and in the embodiment shown it is arranged to reduce or eliminate the inlet turbulence described above. FIGS. 11-14 show one embodiment of the inlet 104 in more detail. The shape of the inlet 104 generally comprises a "bell mouth" shape and is rectangular to match the cross-section of the duct. The inlet is enlarged outer edge 110 and then has a reducing taper toward the duct end 112. This shape provides as an efficient aerodynamic velocity pressure characteristic and unlike a hard edge, its inlet losses are minimal. It is very efficient and in some embodiments, it can nearly present as an "event horizon" (a point of no return). This reduces blow back and increases the particle capture efficiency for the system 100.

Figure 16:
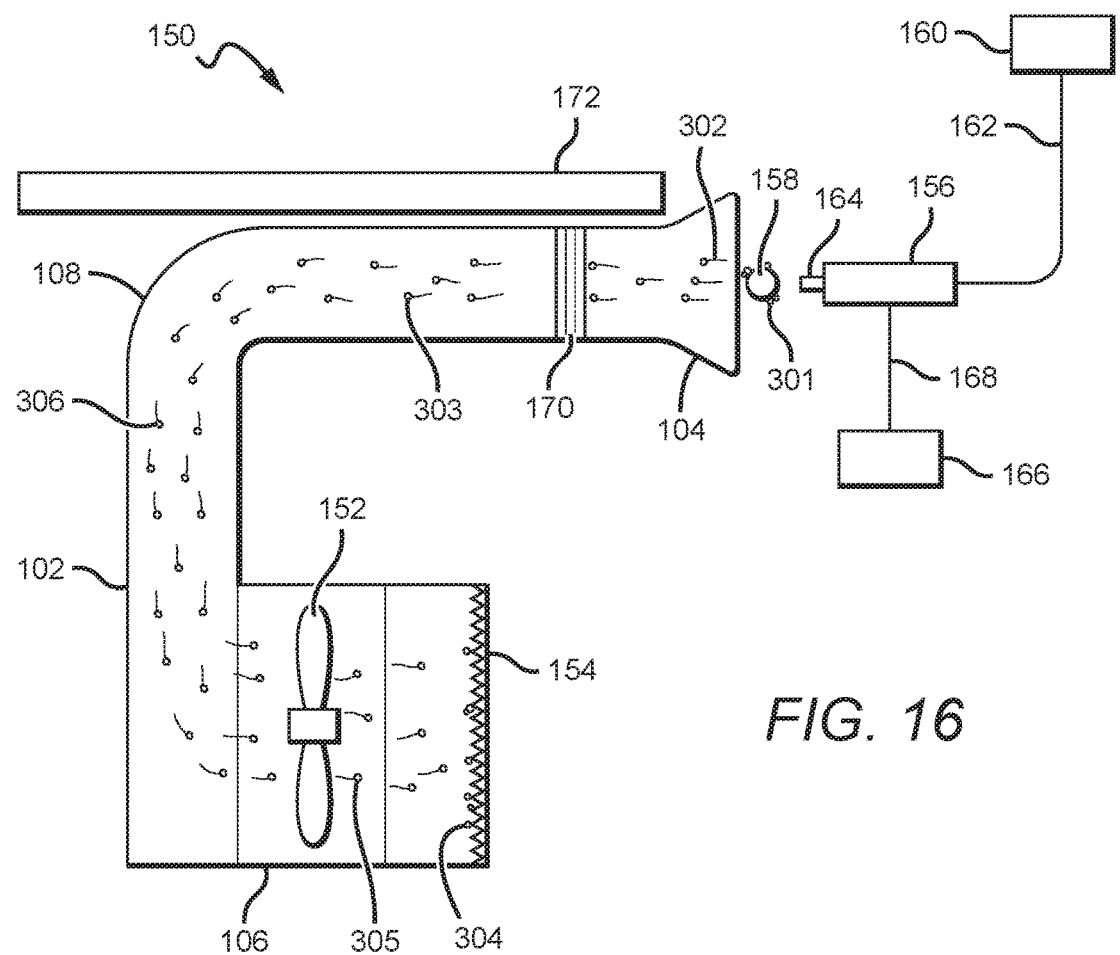
FIG. 16 is a side sectional view of the particle capture system shown in FIG. 15.

FIGS. 15 and 16 show one embodiment of a particle capture system 150 according to the present invention during operation, as it could be arranged at a workstation. The system 150 comprising a duct 102, shaped inlet 104, plenum 106 and duct bent 108, all as described above. The fan plenum 106 is also shown having a fan 152 and filter 154 also as described above, with the filter 154 being downstream from the fan 152 such that the air flow from the fan 152 is pushed against the filter. A standard workstation 150 can also comprise a cleaning apparatus 156 that can be used to clean particles from a work piece 158. The cleaning apparatus 156 typically includes a pressurized air supply 160 that can provide an air stream as described above, with pressure in the air supply being in the range of 5-120 pounds per square inch. A delivery hose 162 can deliver pressurized air from the air supply to an exit nozzle 164 to provide a stream of blow-off air to the work piece 158. Coupled to the nozzle is an ionizing system 166 coupled to the nozzle 164 by conduit 168, with in ionizing system countering static charge at or around the work piece 158 that might hold particles to the work piece 158. This allows the air stream from nozzle 164 to effectively blow the particles from the work piece 158 so that they enter the air stream of the particle capture system.

Downstream from the duct inlet 104, a capture device 170 can be included in the duct 102 to capture a workpiece (or large debris) that is inadvertently dropped into the airstream at the inlet 104. In some embodiments, the capture device 170 can comprise a removable open mesh "safety net", although it is understood that in other embodiments different capture devices can be used. The capture device 170 can be in different locations in the duct 102, and in some embodiments, it is located approximately 12 inches downstream from the inlet 104.

As discussed above, the particulate debris from the work piece 158 can experience three phases of motion. At the first phase, the particles 302 can be dislodged by forced air or pushed off the substrate by air from the blow-off nozzle 164. Next the particles 303 enter the inlet 104 and are entrained/captured in a vacuum conveyance in the 102. The duct compensates for the low velocity/high volume air from the nozzle 164 and after passing through the duct 102, the particles 304 pass through the fan 152 and are pushed or forced against and captured by the filter 154. As discussed above, the inlet 104 and duct comp 102 reduce or eliminate blow-back such that the particles 304 can efficiently pass through the system 150 and are captured at the filter 154.

Referring now to FIG. 17 in conjunction with FIGS. 15 and 16, the system 10 can be used with a work station 171 that can comprise a bench top 172 and in the embodiment shown, the inlet 104 is positioned at the front edge of the bench top 172 and in a location for convenient access by the user 174. In operation, the user 174 can use the table top 172 to work on the work piece 158, and when it is desirable to blow particle off the work piece 158, the user simply lowers the work piece 158 to the inlet 104. The work piece 158 can be held adjacent to or within the inlet 104 and the user 174 can then use the nozzle 164 to provide an airstream to blow off particles from the work piece 158. The particles can then enter the duct 102 and then be pulled to and captured at the filter 154 in the plenum 106.

One advantage of the system 150 is that it is below the bench top 172. This opens up the space on top of the table top for work on the work pieces, and for other devices necessary to perform the work such as tools or other equipment such as a microscopes or test equipment. Space can also be used for work flow, such as trays and packaging equipment.

As discussed above, the duct 102 is generally shaped to follow the underside and back of the work station's table top and back surface. This allows for the system 100 to be mounted to the underside of workstation without significantly interfering with the space under the bench top 174. Accordingly, sufficient space remains for the user's legs so that the workstation can still be comfortably used. It is understood that the duct 102 and plenum 106 can be arranged in many different ways according to the present invention to best match different types of workstations.

Figure 18:
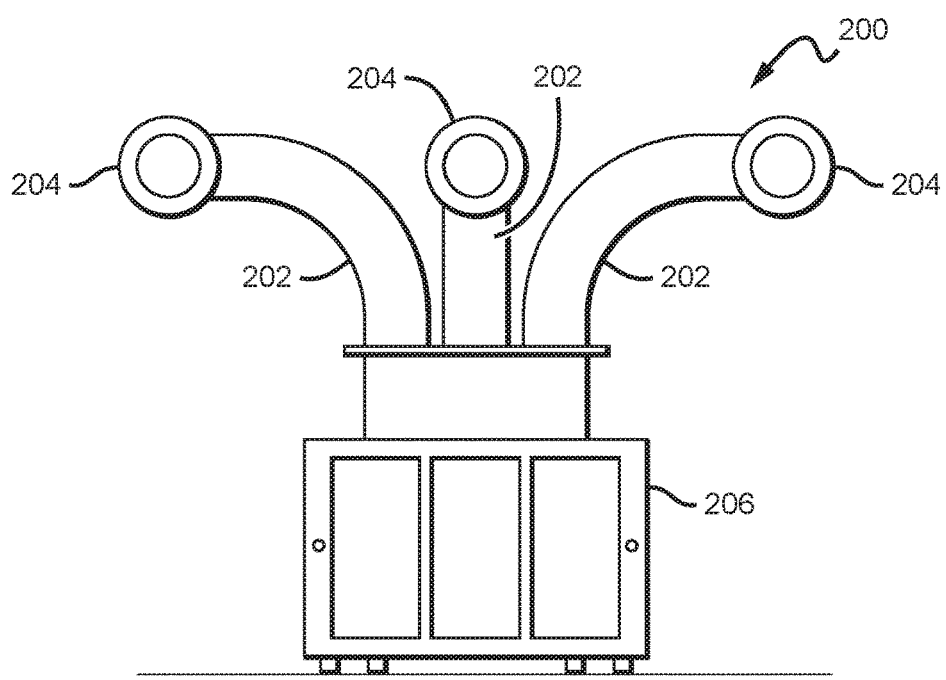
FIG. 18 is a front view of another embodiment of a particle capture system according to the present invention.
Figure 19:
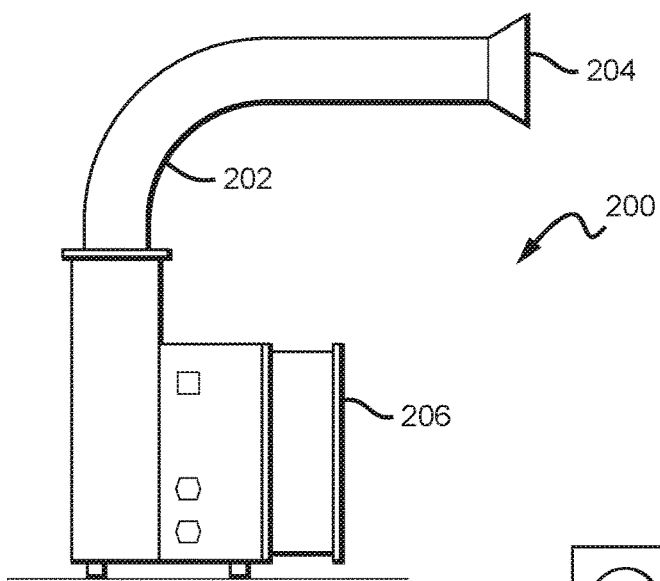
FIG. 19 is a side view of the particle capture system shown in FIG. 18.
Figure 20:
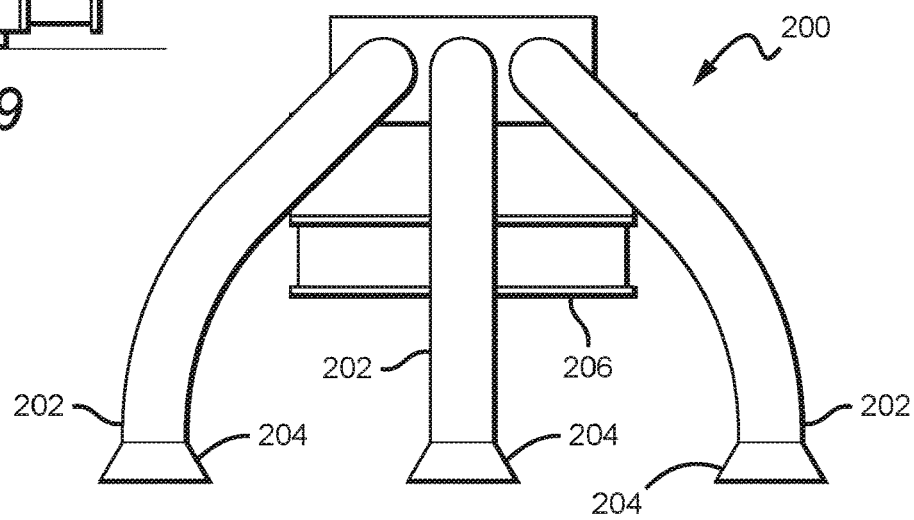
FIG. 20 is a top view of the particle capture system shown in FIG. 18.
Figure 21:
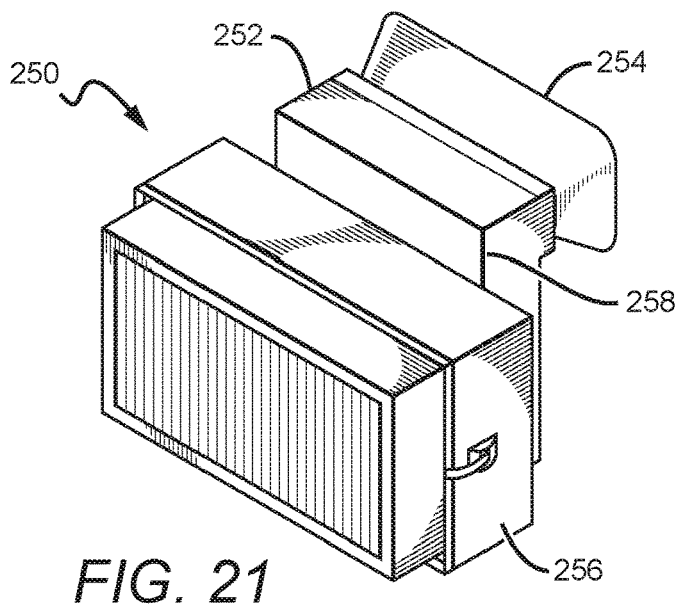
FIG. 21 is a top perspective rear view of another embodiment of a particle capture system according to the present invention.
Figure 22:
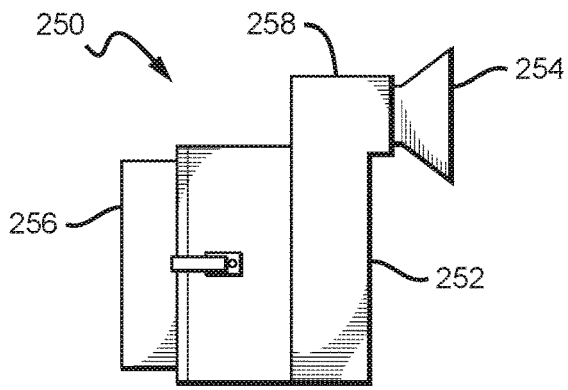
FIG. 22 is a side elevation view of the particle capture system shown in FIG. 21.
Figure 23:
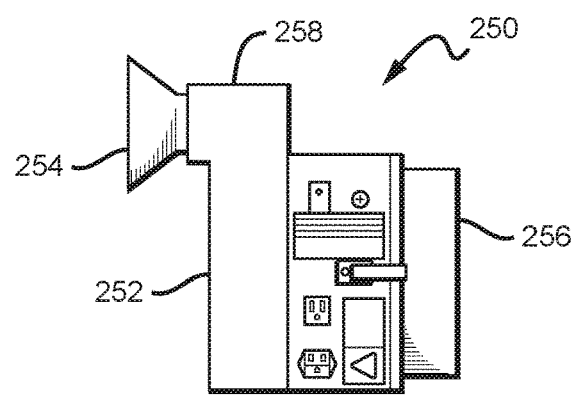
FIG. 23 is an opposing side elevation view of the particle capture system shown in FIG. 21.
Figure 24:
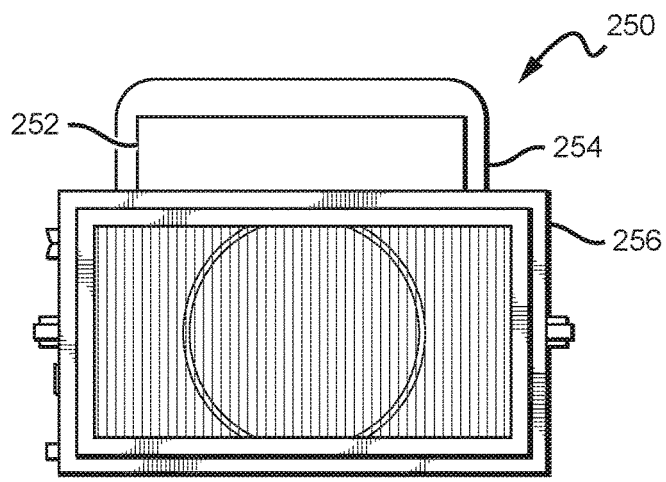
FIG. 24 is a back elevation view of the particle capture system shown in FIG. 21.
Figure 25:
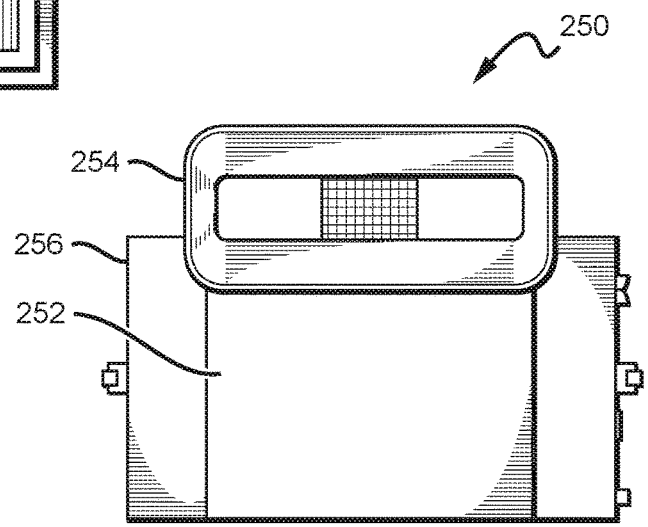
FIG. 25 is a front elevation view of the particle capture system shown in FIG. 21.
Figure 26:
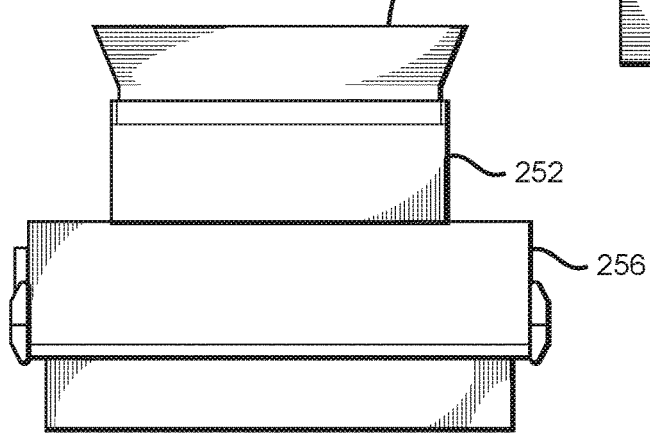
FIG. 26 is a top view of the particle capture system shown in FIG. 21.

Different embodiments of the present invention can be arranged in many different ways and can be made of many different materials than those described above. The ducts and inlets can have different shapes and sizes and can be made of a flexible instead of rigid material. There can also be multiple ducts per plenum or multiple plenums per duct. FIG. 18-20 show another embodiment of a particle capture system 200 according to the present invention that can comprise three ducts 202 coupled to a single plenum 206. Each duct 202 can be arranged as described above and each has its own inlet 204. The system 200 is arranged to be under the table top as described above, and can provide multiple inlets to a single workstation, or one or two inlets to multiple workstations. The plenum 206 can have a single fan and filter or can have multiple fans or filters. This is only one of the many different variations of particle capture systems.

The particle capture systems according to the present invention can also be arranged so that they can be in other locations, such as above or on the workstation table top. FIGS. 21-26 show another embodiment of a particle capture system 250 arranged for being placed on a bench top, with the system comprising a duct 252, and inlet 254 and a plenum 256 similar to those described above. In system 250 the duct 252 has a 90-degree bend 258 similar to the systems described above. In this embodiment, however, horizontal and vertical sections of the duct are shorter to provide a more compact system. This shorter duct leaves less distance for slowing the air velocity from the blow off nozzle, which can require a different capacity plenum fan. While the system 250 is on the bench top and can consume work space, the footprint of the system 250 is smaller than conventional particle capture systems, leaving more space available on the benchtop. The system 250 comprises many of the advantages described above that can result in more efficient particle capture while still exhibiting the benefits of a lower powered fan.

Although the present invention has been described in detail with reference to certain preferred configurations thereof, other versions are possible. Therefore, the spirit and scope of the invention should not be limited to the versions described above.

We claim:

1. A particle capture system, comprising:
    a duct carrying a particle capture air stream;
    a fan at a first end of said duct and generating said particle capture air stream;
    a particle filter also arranged at said first end of said duct with at least some of said particle capture air stream passing through said filter, wherein said particle capture airstream has a first air velocity at said filter; and
    a blow off device providing a blow off airstream into said duct at a second end of said duct, wherein said blow off airstream has a second air velocity at said second end that is higher than said first air velocity, where said duct has one or more intervening features to reduce said second air velocity such that it substantially matches said first air velocity when said blow off airstream reaches said filter.

2. The system of claim 1, further comprising a plenum, said filter and fan housed within said plenum with said filter downstream from said fan.

3. The system of claim 1, wherein said second end comprises a shaped inlet.

4. The system of claim 3, wherein said shaped inlet comprises a bell mouth inlet.

5. The system of claim 1, wherein said one or more intervening features comprises a bend or curve in said duct.

6. The system of claim 1, wherein said one or more intervening features comprises a distance between said second and said filter.

7. The system of claim 1, wherein said duct said duct experiences substantially no blow back.

8. The system of claim 1, wherein the particle capture airstream has a lower velocity and higher volume than said blow off airstream.

9. A particle capture system, comprising:
    a duct with an inlet at a first end and a plenum at a second end, wherein said plenum comprises a negative pressure fan and particle capture filter, said negative pressure fan generating a negative particle capture airstream in said duct that draws particles into said duct at said first end and moves the particles into said filter, wherein said duct comprises features to compensate for the velocity of a blow off air stream entering said inlet, wherein said particle capture airstream has a lower velocity and higher volume than said blow off airstream, and wherein said compensation features slow the velocity of said blow off airstream such that is substantially matches or is less than the particle capture airstream velocity.

10. The system of claim 9, where said filter is downstream from said fan, and particle capture airstream velocity at reaching said fan is substantially the same as the airstream velocity reaching said filter.

11. The system of claim 9, wherein said filter comprises a high efficiency particulate air (HEPA) filter.

12. The system of claim 9, wherein said inlet comprises a shaped inlet.

13. The system of claim 9, wherein said shaped inlet comprises a bell mouth inlet.

14. The system of claim 9, wherein said one or more intervening features comprises a bend or curve in said duct.

15. The system of claim 9, wherein said one or more intervening features comprises a distance between said inlet and said filter.

16. The system of claim 9, wherein said one or more intervening features comprises a combination of a distance between said inlet and said filter, and a bend or curve in said duct.

17. The system of claim 9, where said duct has substantially no blow back.

18. A cleanroom workstation, comprising:
    a bench top; and
    a particle capture system substantially arranged below said bench top, said particle capture system comprising an inlet, a duct and a plenum, wherein said inlet is arranged at the front edge of and below said bench top and said plenum is arranged at the back of and below said bench top.

19. The workstation of claim 18, wherein said inlet is at a first end of said duct and said plenum at a second end of said duct, wherein said plenum comprises a negative pressure fan and particle capture filter.

20. The workstation of claim 18, wherein said negative pressure fan generates a particle capture airstream in said duct that draws particles into said duct at said first end and further draw the particles into said filter.

21. The workstation of claim 18, further comprising a blow off nozzle producing a blow off airstream into said inlet, wherein said duct comprises one or more reducing features to compensate for velocity of said blow off air stream wherein said particle capture airstream has a lower velocity and higher volume than said blow off airstream.

* * * * *